US012676260B2

(12) United States Patent
Kikuchi

(10) Patent No.: US 12,676,260 B2
(45) Date of Patent: Jul. 7, 2026

(54) INDUCTOR

(71) Applicant: Murata Manufacturing Co., Ltd., Kyoto-fu (JP)

(72) Inventor: Seiya Kikuchi, Nagaokakyo (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 870 days.

(21) Appl. No.: 17/934,403

(22) Filed: Sep. 22, 2022

(65) Prior Publication Data

US 2023/0102919 A1 Mar. 30, 2023

(30) Foreign Application Priority Data

Sep. 25, 2021 (JP) ................................ 2021-156214

(51) Int. Cl.
*H01F 27/28* (2006.01)

(52) U.S. Cl.
CPC . *H01F 27/2804* (2013.01); *H01F 2027/2809* (2013.01)

(58) Field of Classification Search
CPC ......... H01F 27/2804; H01F 2027/2809; H01F 17/0013
USPC ........................................ 336/200, 223, 232
See application file for complete search history.

(56) References Cited

U.S. PATENT DOCUMENTS

2001/0015250 A1* 8/2001 Tokuda .................. H01G 4/308 156/89.12
2014/0232504 A1* 8/2014 Tachibana ............. H01F 27/292 336/200
2023/0386722 A1* 11/2023 Akiyama ................ H01F 17/04

FOREIGN PATENT DOCUMENTS

JP 2000-286125 A 10/2000
JP 2017-157770 A 9/2017
JP 2018-184582 A 11/2018

* cited by examiner

*Primary Examiner* — Lincoln D Donovan
(74) *Attorney, Agent, or Firm* — Studebaker Brackett PLLC

(57) ABSTRACT

An inductor in which when transparently viewed in an axis-line direction of a coil, a center position of a long via conductor in a width direction, which is a direction orthogonal to a longitudinal direction of the long via conductor, is deviated from a center position in the width direction of a first pad portion which is one of the pad portions and connected to the long via conductor.

20 Claims, 15 Drawing Sheets

INDUCTOR

CROSS-REFERENCE TO RELATED APPLICATION

This application claims benefit of priority to Japanese Patent Application No. 2021-156214, filed Sep. 25, 2021, the entire content of which is incorporated herein by reference.

BACKGROUND

Technical Field

The present disclosure relates to inductors and, in particular, to an inductor in which a coil is arranged inside a component main body made of a non-conductive material.

Background Art

An inductor interesting for the present disclosure includes a component main body having a multilayer structure formed with a plurality of non-conductive material layers laminated together. Inside the component main body, a coil is arranged. The coil is configured of a plurality of line conductors each extending along an interface between the non-conductive material layers and a plurality of via conductors penetrating through the non-conductive material layers in a thickness direction, and has a form of extending along a helical orbit as a whole by the line conductors and the via conductors alternately connected together.

FIG. 30 schematically depicts an inductor 1. In FIG. 30, a component main body 2 included in the inductor 1 and a coil 3 arranged inside the component main body 2 are depicted in a state of being transparently viewed in an axis-line direction of the coil 3 (direction orthogonal to the sheet of FIG. 30).

The component main body 2 has a multilayer structure formed with a plurality of non-conductive material layers extending in the direction of the sheet of FIG. 30 and laminated together. The coil 3 is configured of a plurality of line conductors 4-1 through 4-5 each extending along an interface between the non-conductive material layers and a plurality of via conductors 5-1 through 5-4 penetrating through the non-conductive material layers in the thickness direction, and has a form of extending along a helical orbit as a whole by the line conductors 4-1 through 4-5 and the via conductors 5-1 through 5-4 alternately connected together. On the outer surface of the component main body 2, a first external terminal electrode 6 and a second external terminal electrode 7 connected to one end and the other end, respectively, of the coil 3 are provided.

With reference to FIG. 30, connections of the plurality of line conductors 4-1 through 4-5 in the coil 3 are more specifically described. To make, for example, four via conductors 5-1 through 5-4 depicted in the drawing distinguished from one another, the four via conductors are provided with reference numerals "5-1", "5-2", "5-3", and "5-4", respectively, as indicated herein. Also, five line conductors connected via the four via conductors 5-1, 5-2, 5-3, and 5-4 are provided with reference numerals "4-1", "4-2", "4-3", "4-4", and "4-5", respectively, as indicated herein. The line conductors 4-1, 4-2, 4-3, 4-4, and 4-5 are each provided so as to extend along a different interface between the non-conductive material layers. In the laminating direction of the non-conductive material layers, subsequently to the interface where the line conductor 4-1 is provided, the interface where the line conductor 4-2 is provided is positioned. Subsequently, the interface where the line conductor 4-3 is provided is positioned. Subsequently, the interface where the line conductor 4-4 is provided is positioned. Subsequently, the interface where the line conductor 4-5 is provided is positioned.

The line conductor 4-1 connected via a first extended conductor 8 to the first external terminal electrode 6 extends to the position of the via conductor 5-1 in a clockwise direction. The via conductor 5-1 connects the line conductor 4-1 and the line conductor 4-2 together. The line conductor 4-2 extends from the position of the via conductor 5-1 to the position of the via conductor 5-2 in a clockwise direction. The via conductor 5-2 connects the line conductor 4-2 and the line conductor 4-3 together. The line conductor 4-3 extends from the position of the via conductor 5-2 to the position of the via conductor 5-3 in a clockwise direction. The via conductor 5-3 connects the line conductor 4-3 and the line conductor 4-4 together. The line conductor 4-4 extends from the position of the via conductor 5-3 to the position of the via conductor 5-4 in a clockwise direction. The via conductor 5-4 connects the line conductor 4-4 and the line conductor 4-5 together. The line conductor 4-5 extends from the position of the via conductor 5-4 in a clockwise direction, and is connected via a second extended conductor 9 to the second external terminal electrode 7.

At an end portion of each of the line conductors 4-1 through 4-5 connected to a relevant one of the via conductors 5-1 through 5-4, a pad portion 10 is provided. The pad portion 10 normally has an area wider than the cross-sectional area of the via conductor 5-1 through 5-4 to ensure reliability of connection between each of the line conductors 4-1 through 4-5 and each of the via conductors 5-1 through 5-4 as shown. Also, each of the via conductors 5-1 through 5-4 has a circular section having a diameter larger than the line width of the line conductors 4-1 through 4-5.

For example, Japanese Unexamined Patent Application Publication No. 2018-184582 describes the inductor 1 in which the section of each of the via conductors 5-1 through 5-4 has a circular shape having a diameter larger than the line width of each of the line conductors 4-1 through 4-5 and the pad portion 10 has a shape which is wider than the cross-sectional area of each of the via conductor 5-1 through 5-4 and is concentric with the section of the respective via conductors 5-1 through 5-4.

SUMMARY

In actual use of the inductor 1 depicted in FIG. 30, in a region R surrounded by the helical orbit formed by the plurality of line conductors 4-1 through 4-5 being collected together, the magnetic flux passes so as to be orthogonal to the sheet of FIG. 30. Meanwhile, in the above-described region R, part of the via conductors 5-1 through 5-4 and, furthermore, part of the pad portions 10 are present as projecting from the inner peripheral side of the line conductors 4-1 through 4-5.

It has been revealed that, in such a state, the via conductors 5-1 through 5-4 and the pad portions 10 interrupt the magnetic flux, thereby affecting the characteristics of the inductor 1, in particular, the Q value.

An inductor according to an aspect of the present disclosure includes a component main body formed of a non-conductive material; and a coil arranged inside the component main body and having a plurality of line conductors each extending along a principal surface of the component main body and a plurality of via conductors each extending perpendicularly to the principal surface of the component main body. The line conductors each have a pad portion connected to a relevant one of the via conductors. The coil has a helical orbit by the line conductors and the via conductors being connected together.

In the inductor, the plurality of via conductors include a long via conductor in a long shape extending along a relevant one of the line conductors. Further, in the inductor, when transparently viewed in an axis-line direction of the coil, a center position of the long via conductor in a width direction which is a direction orthogonal to a longitudinal direction of the long via conductor is deviated from a center position in the width direction of a first pad portion which is one of the pad portions and connected to the long via conductor.

According to the inductor of the above-described aspect, the via conductor can be made so that the degree of projecting to the inner peripheral side of the line conductor is decreased and so as to be prevented from projecting to the inner peripheral side of the line conductor. Therefore, interruption of the magnetic flux by the via conductor can be decreased or eliminated, and it is possible to inhibit the via conductor from affecting the characteristics of the inductor, in particular the Q value.

According to the inductor of the above-described aspect, it is possible to disperse thermal expansion due to application of heat in a manufacturing stage or mounting process of the inductor or in actual operation, and stress at contraction.

DETAILED DESCRIPTION

With reference to FIG. 1 to FIG. 11, an inductor 11 according to a first embodiment of the present disclosure is described.

The inductor 11 includes a component main body 12. The component main body 12 is made of a non-conductive material including at least one type of, for example, glass, resin, and ferrite. Also, when the component main body 12 is formed of a molded body of resin or the like, the non-conductive material may contain a non-magnetic filler such as silica or a magnetic filler such as ferrite or a metal magnetic body. Furthermore, the non-magnetic material may have a structure with a plurality of these glass, ferrite, and resin combined together. The component main body 12 has a rectangular parallelepiped shape. The rectangular parallelepiped shape may be, for example, a shape with its edge portions and corner portions rounded or chamfered.

Figure 1:
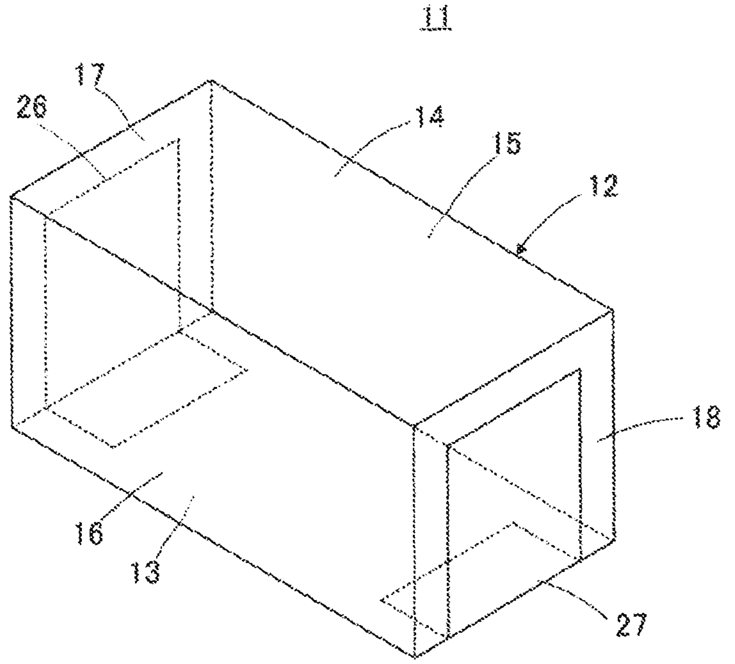
FIG. 1 is a perspective view illustrating an outer appearance of an inductor.

More specifically, as depicted in FIG. 1, the component main body 12 in a rectangular parallelepiped shape has a mount surface 13 oriented to a mount board side, a top surface 14 opposed to the mount surface 13, a first side surface 15 and a second side surface 16 coupling the mount surface 13 and the top surface 14 and opposed to each other, and a first end face 17 and a second end face 18 coupling the mount surface 13 and the top surface 14 and the first side surface 15 and the second side surface 16 and opposed to each other.

The component main body 12 has a multilayer structure with a plurality of non-conductive material layers 19 made of the above-described non-conductive material laminated together. The plurality of non-conductive material layers 19 are laminated from the first side surface 15 toward the second side surface 16. By a principal surface of the non-conductive material layer 19 positioned at each end portion in a laminating direction, each of the first side surface 15 and the second side surface 16 of the component main body 12 is provided. That is, each of the first side surface 15 and the second side surface 16 is one example of the principal surface of the component main body 12.

Figure 2:
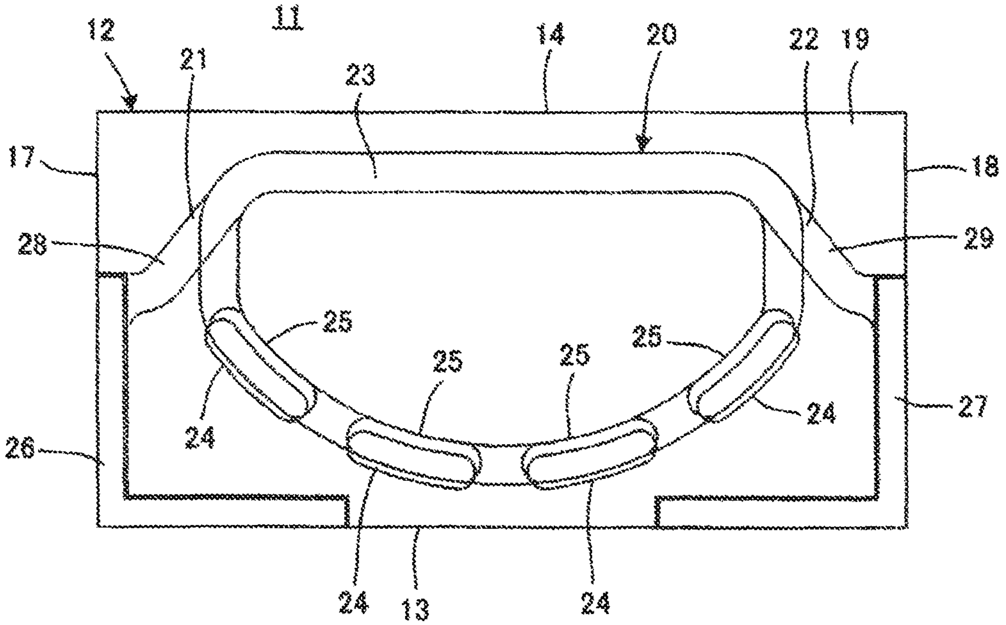
FIG. 2 is a transparent view of the inductor depicted in FIG. 1 along an axis-line direction of a coil.

Inside the component main body 12, as depicted in FIG. 2, a coil 20 is arranged. The coil 20 has a helical orbit. The axis line of the helical orbit of the coil 20 is oriented to a direction orthogonal to the side surfaces 15 and 16, that is, a direction parallel to the mount surface 13. That is, the axis-line direction of the coil 20 is parallel to the mount surface 13 and orthogonal to the first side surface 15 and the second side surface 16. The coil 20 includes a first end portion 21 and a second end portion 22 opposite to each other, and includes a plurality of line conductors 23 extending along any interface of the plurality of non-conductive material layers 19, that is, extending along the first side surface 15 and the second side surface 16, between the first end portion 21 and the second end portion 22, and a plurality of via conductors 24 penetrating through any of the non-conductive material layers 19 in a thickness direction, that is, extending perpendicularly to the first side surface 15 and the second side surface 16. The line conductors 23 each have, at its end portion, a pad portion 25 connected to a relevant one of the via conductors 24. The coil 20 has a helical orbit as a whole by the above-described line conductors 23 and via conductors 24 alternately connected together.

As depicted in FIG. 2, when transparently viewed in an axis-line direction of the coil 20, a direction orthogonal to the longitudinal direction in which the line conductors 23 and the pad portions 25 extend is taken as a width direction of the line conductors 23 and the pad portions 25, respectively. In the present embodiment, the dimension of each line conductor 23 in the width direction is the same as the dimension of each pad portion 25 in the width direction, and the dimension of each via conductor 24 in the width direction is set smaller than the dimension of each pad portion 25 in the width direction.

On the outer surface of the component main body 12, a first external terminal electrode 26 and a second external terminal electrode 27 respectively connected to a first end portion 21 and a second end portion 22 of the coil 20 are provided. The first external terminal electrode 26 and the second external terminal electrode 27 are each provided over two surfaces, that is, the mount surface 13 of the component main body 12 and its adjacent first end face 17 and second end face 18, respectively. If the first external terminal electrode 26 and the second external terminal electrode 27 are provided in the form described above, when the inductor 11 is mounted on the mount board, a solder fillet in an appropriate form can be formed. Thus, a mount state with high reliability can be obtained in view of both electrical connection and mechanical bonding. The first external terminal electrode 26 and the second external terminal electrode 27 are provided so as to penetrate, in the thickness direction, through the plurality of non-conductive material layers 19 except some non-conductive material layers 19 positioned at both end portions in the laminating direction.

The above-described coil 20 and external terminal electrodes 26 and 27 are each formed by patterning a conductive film formed of conductive paste containing, for example, silver, as a conductive component. Also, the non-conductive material layers 19 are each formed by patterning, as required, a non-conductive material film formed of paste containing a non-conductive material containing at least one type of, for example, glass, resin, and ferrite. For patterning the conductive film and the non-conductive material film, for example, photolithography, semi-additive process, screen printing, transfer printing, or the like is applied.

Although not depicted, a plating film may be formed on a portion of the external terminal electrodes 26 and 27 exposed from the component main body 12. The plating film includes, for example, a Ni plated layer and a Sn plated layer thereon.

The via conductors 24 include long via conductors in a long shape extending along the line conductors 23. In the present embodiment, all of the via conductors 24 depicted in the drawings are long via conductors. The reference numeral "24" used for indicating via conductors are also used herein for long via conductors. As can be seen from FIG. 2, the center position of each long via conductor 24 in a width direction which is a direction orthogonal to a longitudinal direction of the long via conductor 24 is deviated from the center position in the width direction of each first pad portion 25 which is one of the pad portions 25 and connected to the relevant long via conductor 24. More specifically, when transparently viewed in the axis-line direction of the coil 20 (direction orthogonal to the sheet of FIG. 2), the center position of the long via conductor 24 in the width direction is deviated from the center position of the line conductor 23 in the width direction to an outer peripheral side of the helical orbit formed by the line conductors 23. Preferably, the long via conductors 24 are each set so as not to project from the inner peripheral edge of the line conductor 23.

Note that while the inner peripheral edge of the long via conductor 24 is positioned away from the inner peripheral edge of the line conductor 23 in FIG. 2, the dimension of the long via conductor 24 in the width direction may be set larger than the dimension of the line conductor 23 in the width direction to make the inner peripheral edge of the long via conductor 24 positioned on the inner peripheral edge of the line conductor 23. Furthermore, if the dimension of the long via conductor 24 in the width direction is set larger than the dimension of the pad portion 25 in the width direction while the dimension of the pad portion 25 in the width direction is set larger than the dimension of the line conductor 23 in the width direction, it is possible to advantageously disperse thermal expansion due to application of heat in a manufacturing stage or mounting process of the inductor 11 or in actual operation, and stress at contraction.

With reference mainly to FIG. 3 to FIG. 11, connections of the plurality of line conductors 23 in the coil 20 are more specifically described.

To make the four via conductors 24 depicted in FIG. 2 distinguished from one another, the four via conductors 24 are provided with reference numerals "24-1", "24-2", "24-3", and "24-4", respectively.

Also, five line conductors 23 connected via the four via conductors 24-1, 24-2, 24-3, and 24-4 are provided with reference numerals "23-1", "23-2", "23-3", "23-4", and "23-5", respectively. The line conductors 23-1, 23-2, 23-3, 23-4, and 23-5 are each provided so as to extend along different interfaces between the non-conductive material layers 19.

Furthermore, the pad portions 25 provided by the end portions of the line conductors 23-1, 23-2, 23-3, and 23-4 are provided with reference numerals "25-1", "25-2", "25-3", and "25-4", respectively.

Still further, the non-conductive material layers 19 having the line conductors 23-1, 23-2, 23-3, 23-4, and 23-5, respectively, on their principal surfaces are provided with reference numerals "19-1", "19-2", "19-3", "19-4", and "19-5", respectively. The non-conductive material layers 19-1, 19-2, 19-3, 19-4, and 19-5 are laminated in this order from bottom to top.

To the first end portion 21 and the second end portion 22 of the coil 20, a first extended conductor 28 and a second extended conductor 29 are connected, respectively. These first extended conductor 28 and second extended conductor 29 are provided by extended portions of the line conductors 23-1 and 23-5 which respectively position the first end portion 21 and the second end portion 22 of the coil 20.

Note that in the specification, "line conductor", "extended conductor", and "external terminal electrode" are defined and distinguished from one another as follows: "line conductor" refers to an orbital portion when transparently viewed in the axis-line direction of the coil; "extended conductor" refers to a portion extended out of the orbital portion; and "external terminal electrode" refers to a portion exposed from the component main body.

Figure 3:
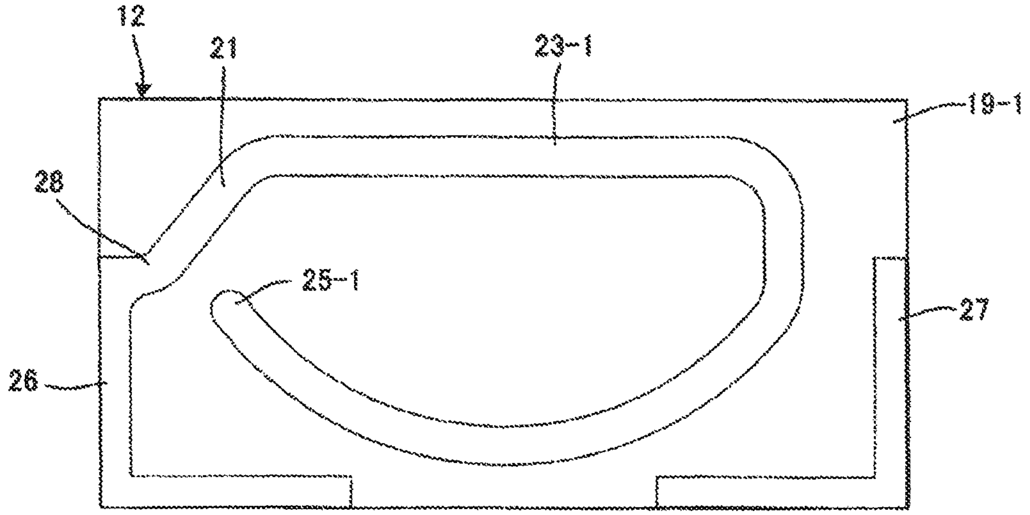
FIG. 3 depicts part of the inductor depicted in FIG. 2, and is a plan view depicting a non-conductive material layer provided with a line conductor which provides a first end portion of the coil.

First, as depicted in FIG. 3, on the non-conductive material layer 19-1, the line conductor 23-1 connected via the first extended conductor 28 to the first external terminal electrode 26 extends to the pad portion 25-1 in a clockwise direction.

Figure 4:
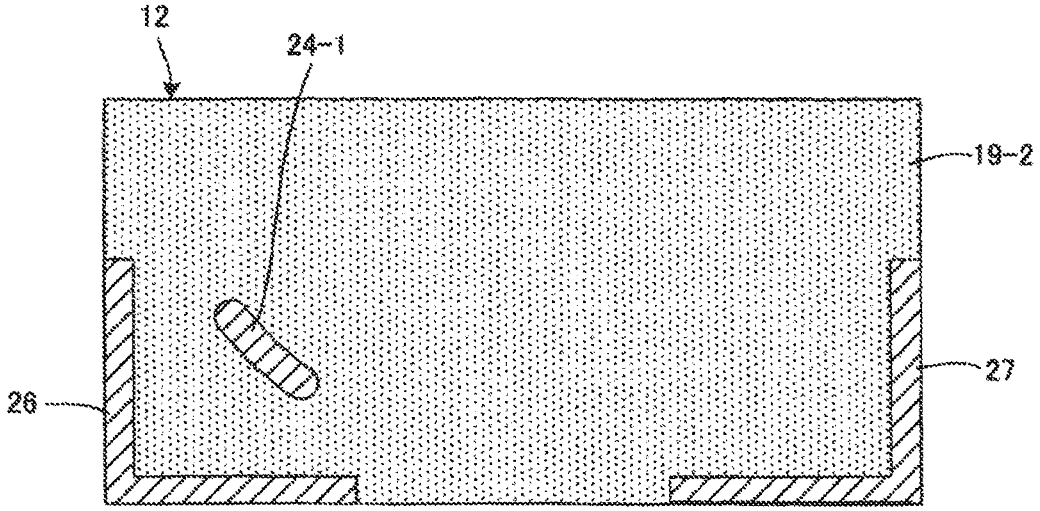
FIG. 4 depicts part of the inductor depicted in FIG. 2, and is a sectional view depicting a non-conductive material layer provided with a via conductor connected to the line conductor.

Next, the non-conductive material layer 19-2 depicted in FIG. 4 is laminated on the non-conductive material layer 19-1. The long via conductor 24-1 is provided so as to penetrate through the non-conductive material layer 19-2. The long via conductor 24-1 connects the line conductor 23-1 and the line conductor 23-2 depicted in FIG. 5 together via the pad portion 25-1.

Figure 5:
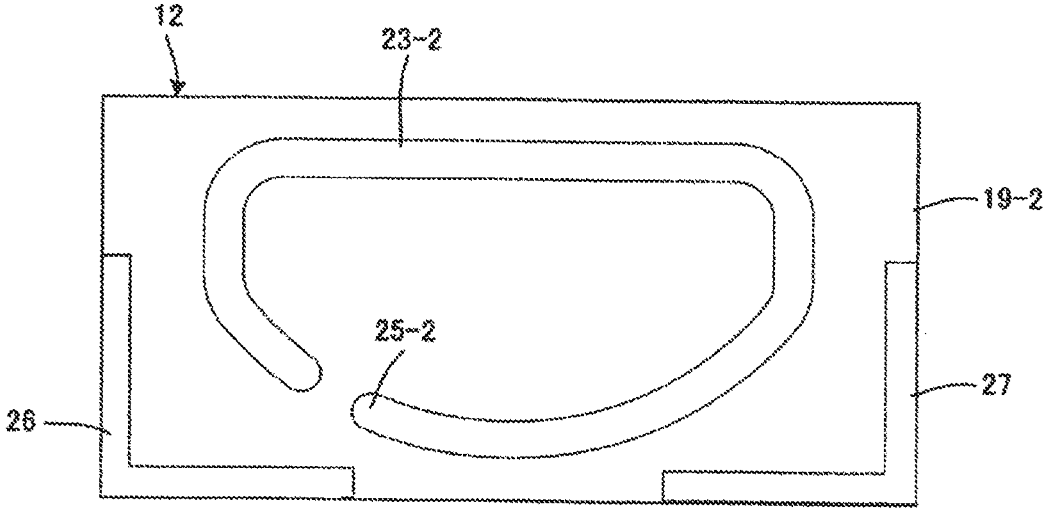
FIG. 5 depicts part of the inductor depicted in FIG. 2, and is a plan view depicting the non-conductive material layer provided with a line conductor connected to the via conductor.

Next, as depicted in FIG. 5, on the non-conductive material layer 19-2, the line conductor 23-2 extends from the position of the long via conductor 24-1 to the pad portion 25-2 in a clockwise direction.

Figure 6:
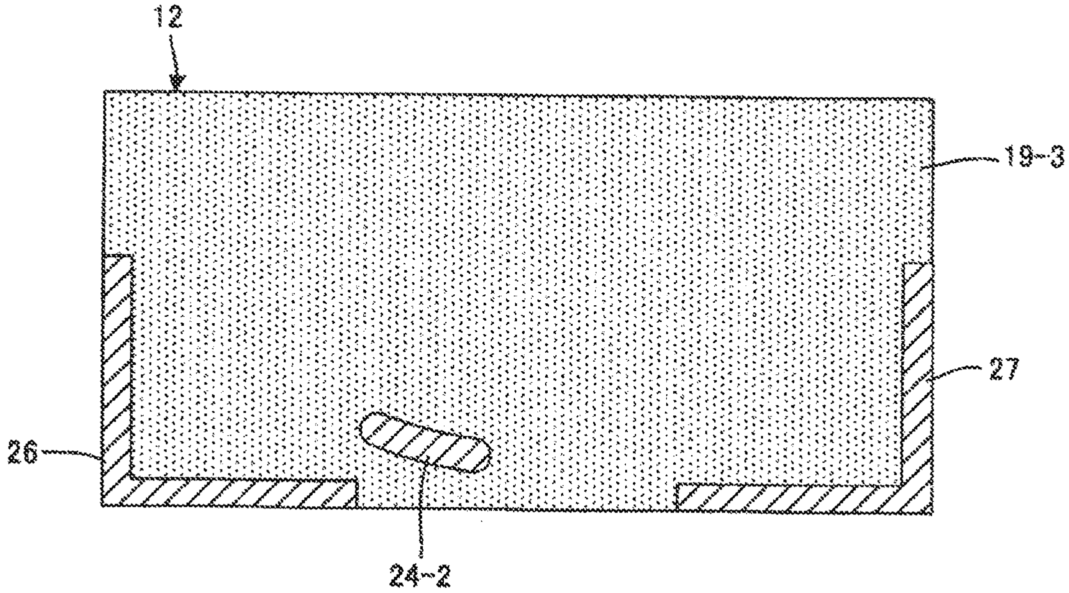
FIG. 6 depicts part of the inductor depicted in FIG. 2, and is a sectional view depicting a non-conductive material layer provided with a via conductor connected to the line conductor.

Next, the non-conductive material layer 19-3 depicted in FIG. 6 is laminated on the non-conductive material layer 19-2. The long via conductor 24-2 is provided so as to penetrate through the non-conductive material layer 19-3. The long via conductor 24-2 connects the line conductor 23-2 and the line conductor 23-3 depicted in FIG. 7 together via the pad portion 25-2.

Figure 7:
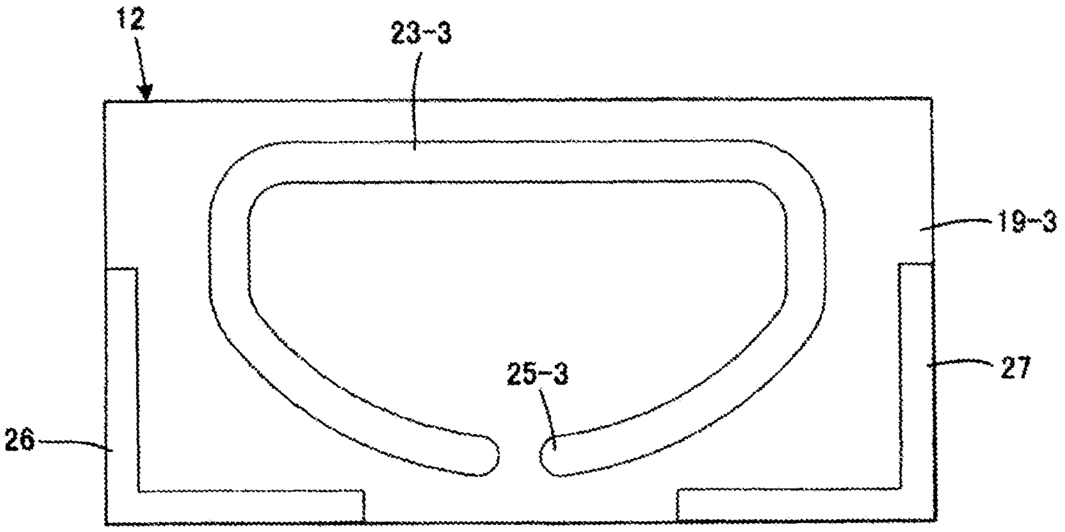
FIG. 7 depicts part of the inductor depicted in FIG. 2, and is a plan view depicting the non-conductive material layer provided with a line conductor connected to the via conductor.

Next, as depicted in FIG. 7, on the non-conductive material layer 19-3, the line conductor 23-3 extends from the position of the long via conductor 24-2 to the pad portion 25-3 in a clockwise direction.

Figure 8:
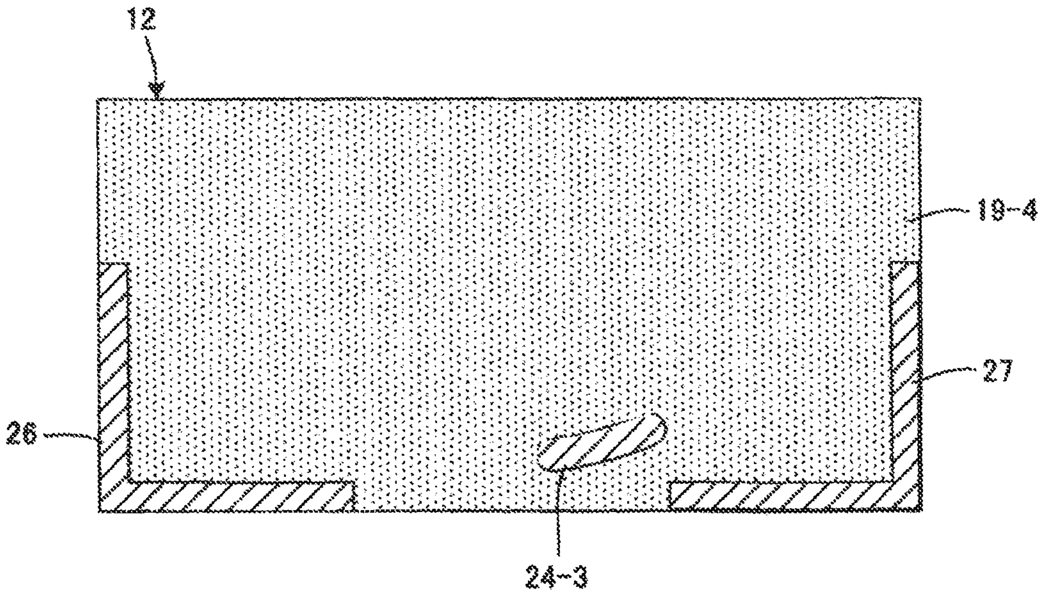
FIG. 8 depicts part of the inductor depicted in FIG. 2, and is a sectional view depicting a non-conductive material layer provided with a via conductor connected to the line conductor.

Next, the non-conductive material layer 19-4 depicted in FIG. 8 is laminated on the non-conductive material layer 19-3. The long via conductor 24-3 is provided so as to penetrate through the non-conductive material layer 19-4. The long via conductor 24-3 connects the line conductor 23-3 and the line conductor 23-4 depicted in FIG. 9 together via the pad portion 25-3.

Figure 9:
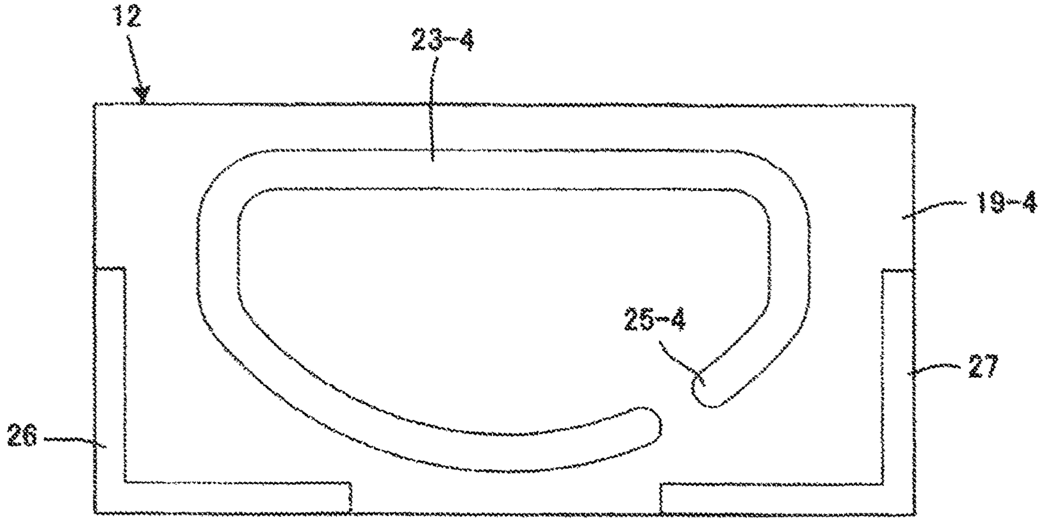
FIG. 9 depicts part of the inductor depicted in FIG. 2, and is a plan view depicting the non-conductive material layer provided with a line conductor connected to the via conductor.

Next, as depicted in FIG. 9, on the non-conductive material layer 19-4, the line conductor 23-4 extends from the position of the long via conductor 24-3 to the pad portion 25-4 in a clockwise direction.

Figure 10:
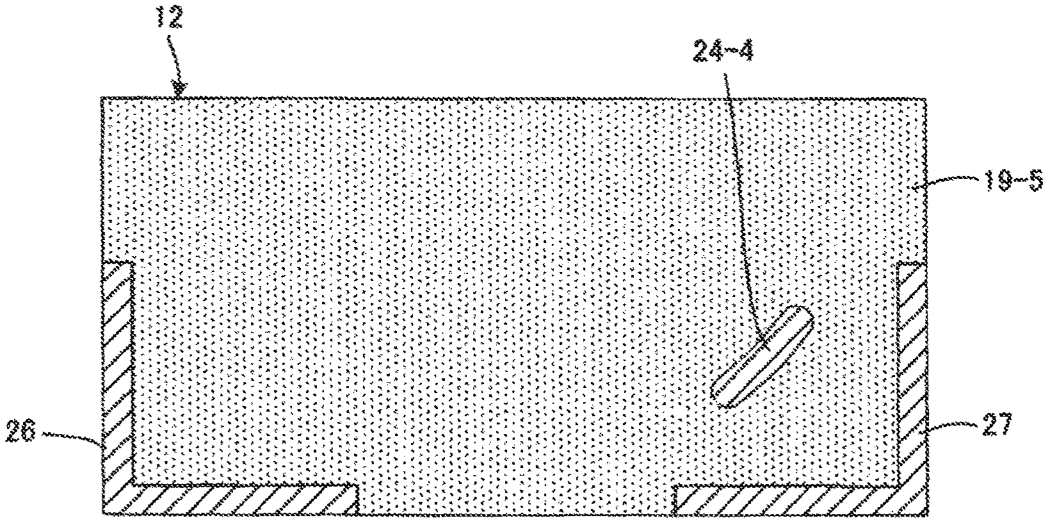
FIG. 10 depicts part of the inductor depicted in FIG. 2, and is a sectional view depicting a non-conductive material layer provided with a via conductor connected to the line conductor.

Next, the non-conductive material layer 19-5 depicted in FIG. 10 is laminated on the non-conductive material layer 19-4. The long via conductor 24-4 is provided so as to penetrate through the non-conductive material layer 19-5. The long via conductor 24-4 connects the line conductor 23-4 and the line conductor 23-5 depicted in FIG. 11 together via the pad portion 25-4.

Figure 11:
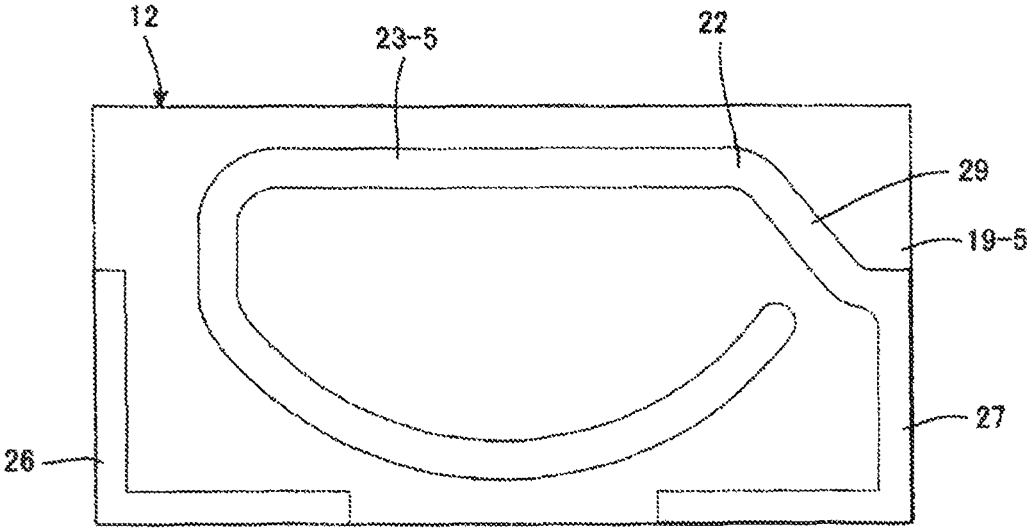
FIG. 11 depicts part of the inductor depicted in FIG. 2, and is a plan view depicting a non-conductive material layer provided with a line conductor which is connected to the via conductor and provides a second end portion of the coil.

Next, as depicted in FIG. 11, on the non-conductive material layer 19-5, the line conductor 23-5 extends from the position of the long via conductor 24-4 in a clockwise direction and is connected via the second extended conductor 29 to the second external terminal electrode 27.

As described above, according to the first embodiment, when transparently viewed in the axis-line direction of the coil 20, the long via conductor 24 can be easily prevented from projecting to the inner peripheral side of the line conductor 23. Therefore, a concern of occurrence of an interruption of the magnetic flux by the via conductor 24 is decreased, and it is possible to inhibit the via conductor 24 from affecting the characteristics of the inductor 11, in particular, the Q value.

Also, in the course of manufacturing the inductor 11, even if a deviation in lamination occurs, the possibility of projection of the long via conductor 24 to the inner peripheral side of the line conductor 23 is reduced, and thus a stable inductance value, that is, one with a narrow deviation, can be obtained in the inductor 11.

Also, even if the degree of projecting to the inner peripheral side of the line conductor 23 is decreased or the long via conductor 24 is prevented from projecting to the inner peripheral side of the line conductor 23, the long via conductor 24 has a long shape extending along the line conductor 23. Thus, compared with a circular via conductor, a large area of contact with the line conductor 23 can be acquired, and therefore reliability of connection with the line conductor 23 can be enhanced.

Also, according to the first embodiment, the center position of the long via conductor 24 in the width direction orthogonal to the longitudinal direction is deviated from the center position of the line conductor 23 in the width direction. Thus, it is possible to disperse thermal expansion due to application of heat in the manufacturing stage or mounting process of the inductor 11 or in actual operation, and stress at contraction.

The above-described effects by the long via conductors 24 obtained in the first embodiment are exerted also by a second embodiment onward described below.

Figure 12:
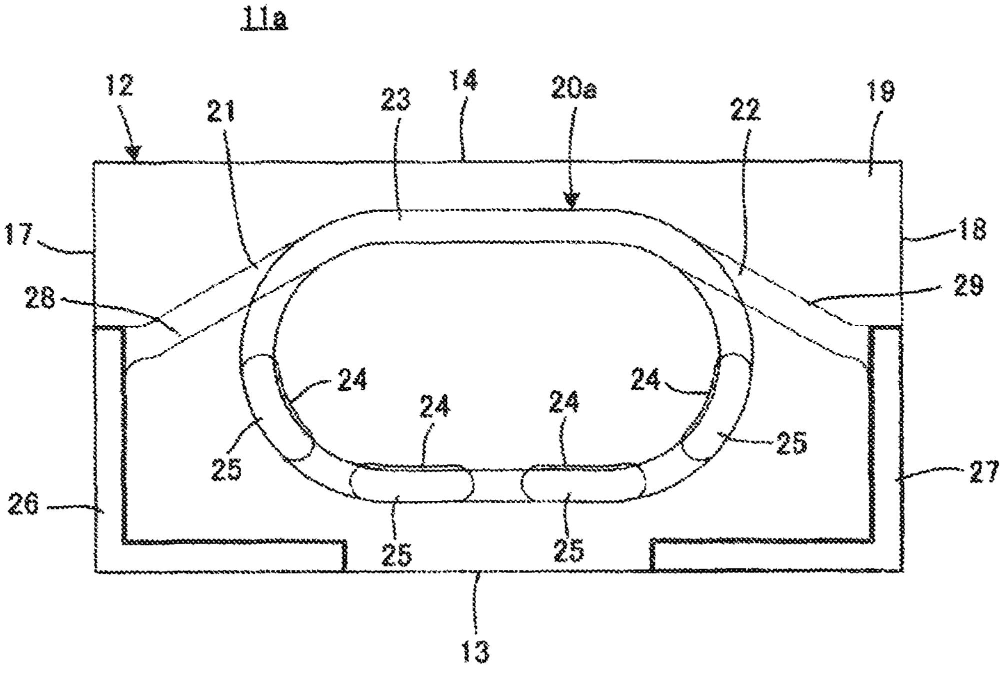
FIG. 12 is a view depicting an inductor, corresponding to FIG. 2.

Next, with reference to FIG. 12, an inductor 11*a* according to the second embodiment of the present disclosure is described. FIG. 12 is a view corresponding to FIG. 2. In FIG. 12, components corresponding to components depicted in FIG. 2 are provided with the same reference numeral and redundant description is omitted.

As with the inductor 11 depicted in FIG. 2, in the inductor 11*a* depicted in FIG. 12, the center position of the long via conductor 24 in the width direction is deviated from the center position of the line conductor 23 and the pad portion 25 in the width direction. However, in the inductor 11*a*, in contrast to the inductor 11 depicted in FIG. 2, when transparently viewed in the axis-line direction of a coil 20*a*, the center position of the long via conductor 24 in the width direction is deviated from the center position of the line conductor 23 in the width direction to an inner peripheral side of the helical orbit formed by the line conductor 23.

Note that in FIG. 12, the long via conductor 24 does not project from the outer peripheral edge of the line conductor 23, and the outer peripheral edge of the long via conductor 24 is positioned on the outer peripheral edge of the line conductor 23. When the long via conductor 24 does not project from the outer peripheral edge of the line conductor 23 in this manner, the line conductor 23 can be made closer to the external terminal electrodes 26 and 27 and the edge of the component main body 12. Thus, the inner diameter of the coil 20*a* can be increased, and the Q value of the inductor 11*a* can be improved. Also, when the outer peripheral edge of the long via conductor 24 is positioned on the outer peripheral edge of the line conductor 23, in the above-described structure in which no-projection can improve the Q value of the inductor 11*a*, the area of contact between the line conductor 23 and the via conductor 24 can be increased at maximum, and connection reliability can be improved.

According to the second embodiment, firstly, as with the first embodiment, the degree of projection of the via conductor 24 to the inner peripheral side of the line conductor 23 can be decreased, and affecting the Q value can be inhibited. Also, it is possible to disperse thermal expansion due to application of heat in the manufacturing stage or mounting process of the inductor 11*a* or in actual operation, and stress at contraction.

Also, according to the second embodiment, while the degree of projection to the inner peripheral side of the line conductor 23 is decreased by the long via conductor 24, the area of connection between the line conductor 23 and the long via conductor 24 can be increased, and connection reliability at the connecting portion can be improved.

Furthermore, the second embodiment also has a feature in which the dimension of the long via conductor 24 in the width direction is larger than the dimension of the line conductor 23 in the width direction. This leads to an increase in the area of connection between the line conductor 23 and the long via conductor 24, thereby allowing connection reliability at the connecting portion to be improved.

Also in the second embodiment, although not clearly depicted in FIG. 12, the line conductor 23 has pad portions 25 connected to the long via conductors 24. The dimension of each long via conductor 24 in the width direction is made larger than the dimension of each pad portion 25 in the width direction. According to this structure, it is possible to advantageously disperse thermal expansion due to application of heat in the manufacturing stage or mounting process of the inductor or in actual operation, and stress at contraction.

The feature of the above-described second embodiment, that is, the feature in which the dimension of the long via conductor 24 in the width direction is larger than the dimension of the line conductor 23 in the width direction, can be applied also to an embodiment in which the center position of the long via conductor 24 in the width direction is deviated from the center position of the line conductor 23 in the width direction to the outer peripheral side of the helical orbit formed by the line conductor 23.

Note that the mode of the coil 20*a* depicted in FIG. 12 is different from the mode of the coil 20 depicted in FIG. 2 and others. This indicates that, firstly, the coil can take any of various modes. Also, in the coil 20*a* depicted in FIG. 12, compared with the coil 20 depicted in FIG. 2 and others, asperities can be decreased on its inner peripheral edge side. Therefore, loss due to current concentration or the like can be inhibited.

Figure 13:
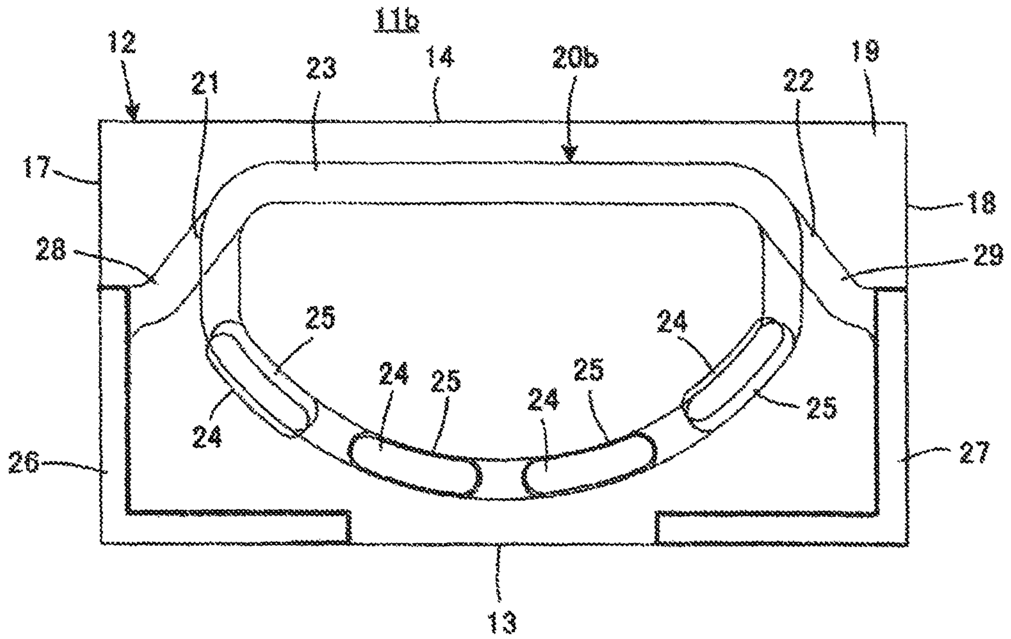
FIG. 13 is a view depicting an inductor, corresponding to FIG. 2.

A third embodiment is possible by combining the feature of the first embodiment and the feature of the second embodiment described above. FIG. 13 is a view corresponding to FIG. 2, depicting an inductor 11*b* according to the third embodiment of the present disclosure. In FIG. 13, components corresponding to components depicted in FIG. 2 are provided with the same reference numeral and redundant description is omitted.

In the inductor 11*b* depicted in FIG. 13, a plurality of long via conductors are provided. These long via conductors include, for example, a first long via conductor 24-1, a second long via conductor 24-2, a third long via conductor 24-3, and a fourth long via conductor 24-4. Here, the center position of the first long via conductor 24-1 in the width direction is deviated from the center position of the line conductor 23 and pad portion 25 in the width direction to the outer peripheral side of a helical orbit formed by a coil 20*b*. The center position of each of the second and third long via conductors 24-2 and 24-3 in the width direction matches the center position of the line conductor 23 and pad portion 25 in the width direction. The center position of the fourth long via conductor 24-4 in the width direction is deviated from the center position of the line conductor 23 and pad portion 25 in the width direction to the inner peripheral side of the helical orbit formed by the coil 20*b*.

According to the third embodiment, the inductance characteristics of narrow deviation according to the first embodiment and high connection reliability according to the second embodiment can be both achieved.

The first to third embodiments commonly have a feature in which the number of turns of the line conductor 23 in the same interface between the non-conductive material layers 19 is larger than or equal to 0.7 turns and smaller than 2 turns (i.e., from 0.7 turns to smaller than 2 turns). If the above-described number of turns is 0.7 turns and larger, leakage of the magnetic flux can be decreased. If the above-described number of turns is smaller than 2 turns, a wide area of passage of the magnetic flux can be ensured.

Note that, as for the above-described number of turns, one turn is defined as follows. A tangent is sequentially drawn from the leading edge to the trailing edge of the line conductor 23 along the outer periphery of the line conductor 23, and one turn is defined at a stage in which this tangent is rotated at 360 degrees.

Also, the first to third embodiments commonly have a feature in which the number of turns of the line conductor 23 in the same interface between the non-conductive material layers 19 is smaller than one turn and the line conductors 23 each along the interface between the non-conductive material layers 19, that is, the line conductors 23-2, 23-3, and 23-4, have a same number of turns. According to this structure, as can be seen from, for example, FIG. 2, each space among the long via conductors 24-1, 24-2, 24-3, and 24-4 is equal, a bottleneck due to the cross-sectional area in a current route provided by the coil 20 can be eliminated, and occurrence of loss due to current concentration or the like can be suppressed.

Figure 14:
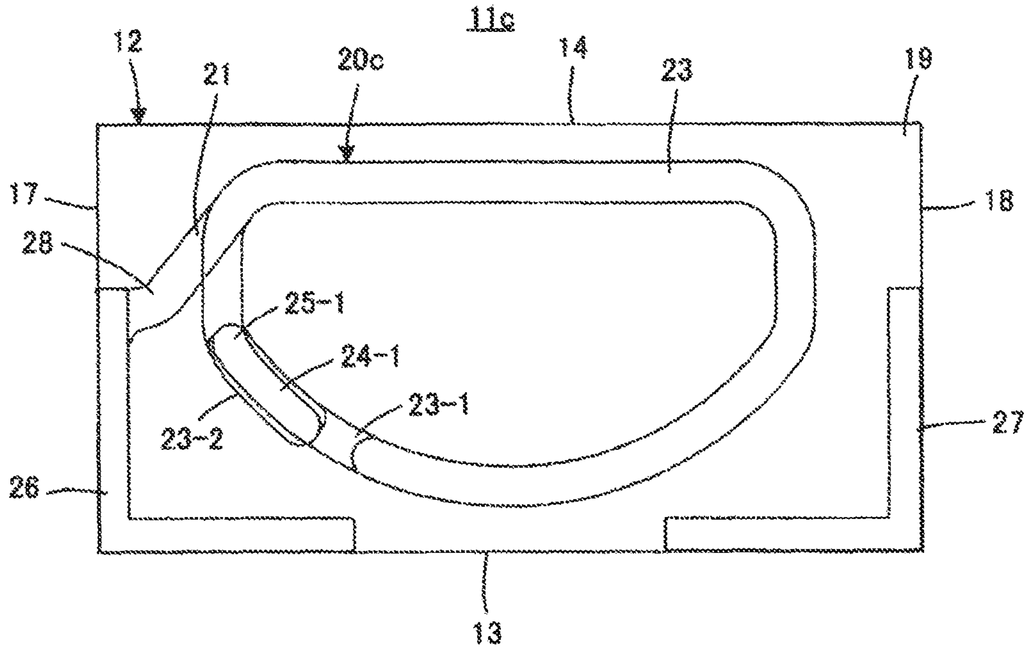
FIG. 14 is a transparent view of part of a coil included in an inductor along an axis-line direction of the coil.

Next, with reference to FIG. 14 to FIG. 17, a fourth embodiment of the present disclosure is described. FIG. 14 is a view of part of a coil 20*c* included in an inductor 11*c* according to the fourth embodiment transparently viewed in an axis-line direction of the coil 20*c*. FIG. 14 to FIG. 17 are views corresponding to FIG. 2 to FIG. 5, respectively. In FIG. 14 to FIG. 17, components corresponding to components depicted in FIG. 2 to FIG. 5 are provided with the same reference numeral and redundant description is omitted.

FIG. 14 depicts the first extended conductor 28, and the line conductors 23-1 and 23-2 and the long via conductor 24-1 in the coil 20*c*.

Figure 15:
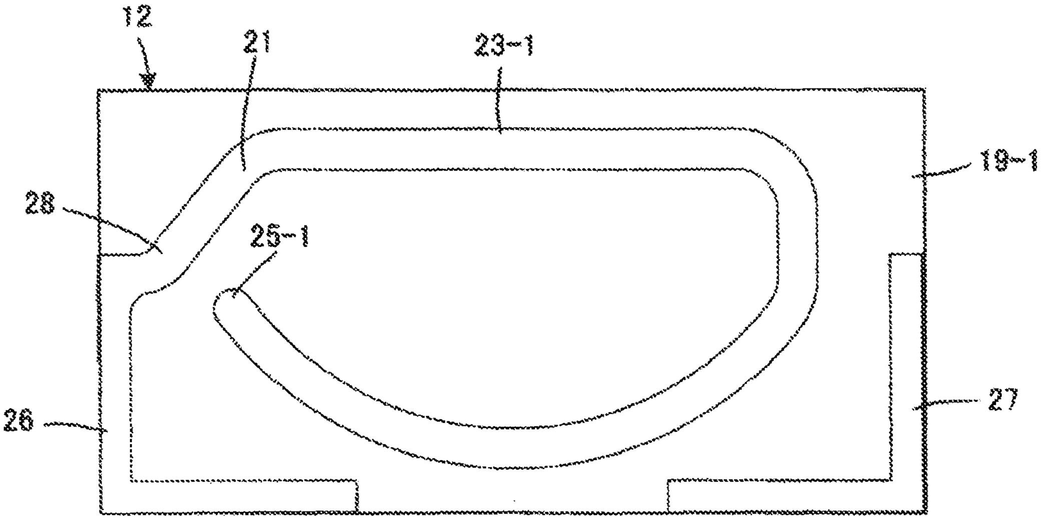
FIG. 15 depicts part of the inductor depicted in FIG. 14, and is a plan view depicting the non-conductive material layer provided with the line conductor which provides the first end portion of the coil.

As depicted in FIG. 15, on the non-conductive material layer 19-1, the line conductor 23-1 connected via the first extended conductor 28 to the first external terminal electrode 26 extends to the pad portion 25-1 in a clockwise direction.

Figure 16:
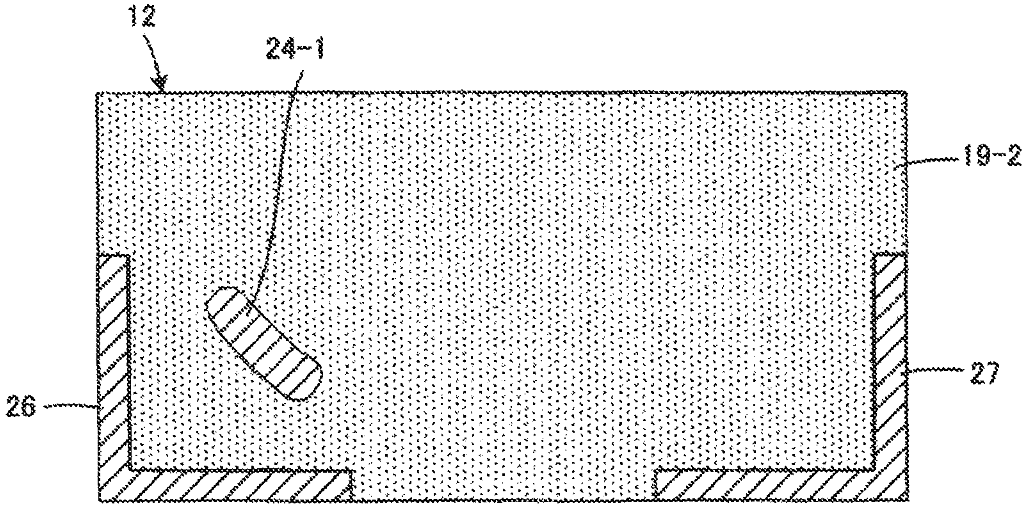
FIG. 16 depicts part of the inductor depicted in FIG. 14, and is a sectional view depicting the non-conductive material layer provided with the via conductor connected to the line conductor.

Next, the non-conductive material layer 19-2 depicted in FIG. 16 is laminated on the non-conductive material layer 19-1. The via conductor 24-1 is provided so as to penetrate through the non-conductive material layer 19-2. The via conductor 24-1 connects the line conductor 23-1 and the line conductor 23-2 depicted in FIG. 17 together via the pad portion 25-1. The via conductor 24-1 depicted in FIG. 16 has a dimension in a width direction larger than that of the via conductor 24-1 depicted in FIG. 4.

Figure 17:
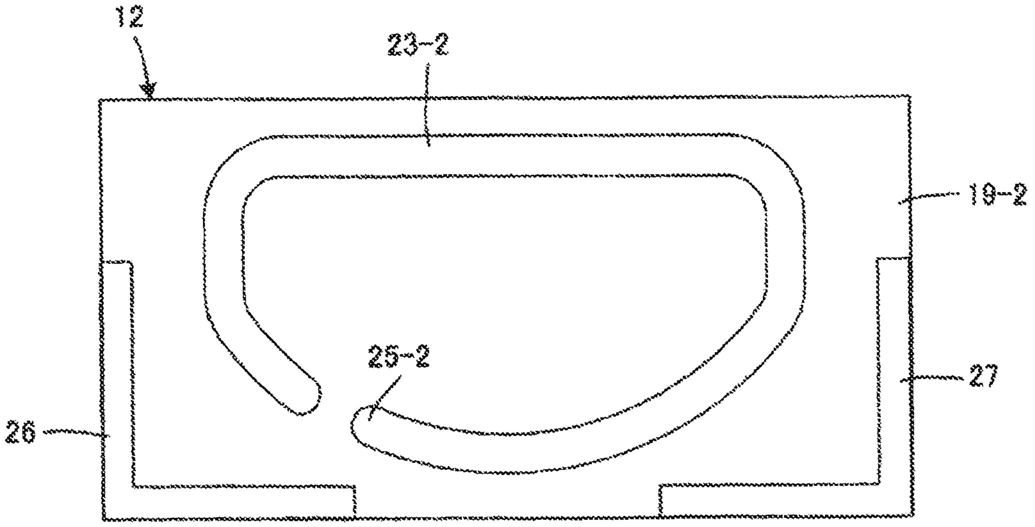
FIG. 17 depicts part of the inductor depicted in FIG. 14, and is a plan view depicting the non-conductive material layer provided with the line conductor connected to the via conductor.

Next, as depicted in FIG. 17, on the non-conductive material layer 19-2, the line conductor 23-2 extends from the position of the long via conductor 24-1 to the pad portion 25-2 in a clockwise direction.

In the fourth embodiment, the coil 20*c* includes the long via conductor 24-1, a first pad portion 25-1, a first line conductor 23-1 which is one of the plurality of line conductors 23 and has the first pad portion 25-1, and a second line conductor 23-2 which is one of the plurality of line conductors 23 and is connected to the long via conductor 24-1 from the opposite side to the first pad portion 25-1. As can be seen from FIG. 14, in the coil 20*c*, when transparently viewed in an axis-line direction of the coil 20*c*, the center position of the long via conductor 24-1 in the width direction thereof is deviated from the center position of the first pad portion 25-1, and the center position of the long via conductor 24-1 in the width direction is deviated from the center position in the width direction of the part of the second line conductor 23-2 where the long via conductor 24-1 is connected. More specifically, while the dimension of the long via conductor 24-1 in the width direction is relatively increased, the inner peripheral edge of the first pad portion 25-1 of the first line conductor 23-1 is in contact with the inner peripheral edge of the long via conductor 24-1, and the outer peripheral edge of the second line conductor 23-2 is in contact with the outer peripheral edge of the long via conductor 24-1.

According to this structure, it is possible to advantageously disperse contraction stress received by the long via conductor 24-1 from the first line conductor 23-1 and the second line conductor 23-2 at contraction after application of heat in the manufacturing stage or mounting process of the inductor or in actual operation, and occurrence of rupture of the long via conductor 24-1 can be suppressed. Note that while the above description has been made for the long via conductor 24-1, which is part of the coil 20*c*, the same goes for the other long via conductors.

Figure 18:
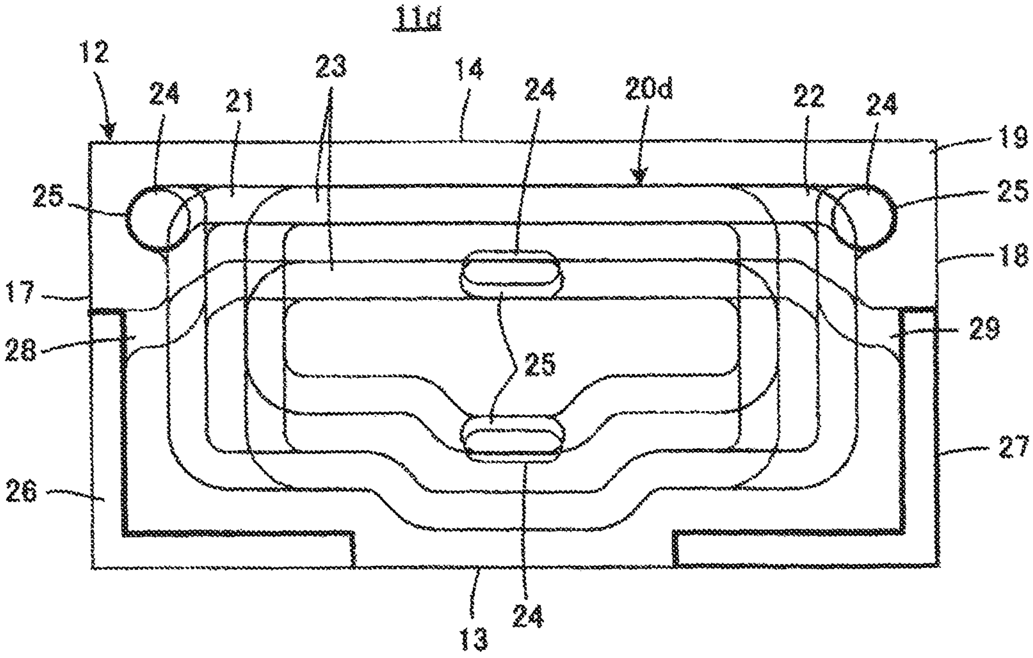
FIG. 18 is a view depicting an inductor, corresponding to FIG. 2.

Next, with reference to FIG. 18 to FIG. 29, a fifth embodiment of the present disclosure is described. FIG. 18 is a view corresponding to FIG. 2, depicting an inductor 11*d* according to the fifth embodiment. FIG. 19 to FIG. 29 are views corresponding to FIG. 3 to FIG. 11, respectively. In FIG. 18 to FIG. 29, components corresponding to components depicted in FIG. 2 to FIG. 11 are provided with the same reference numeral and redundant description is omitted.

The inductor 11*d* according to the fifth embodiment has a feature in which the number of turns of the line conductor 23 in the same interface between the non-conductive material layers 19 exceeds one turn and is less than 2 turns.

With reference to FIG. 18, to the first end portion 21 and the second end portion 22 of a coil 20*d* included in the inductor 11*d* according to the fifth embodiment, the first extended conductor 28 and a second extended conductor 29 are respectively connected.

With reference mainly to FIG. 19 to FIG. 29, connections of the plurality of line conductors 23 in the coil 20*d* included in the inductor 11*d* according to the fifth embodiment are described.

Figure 19:
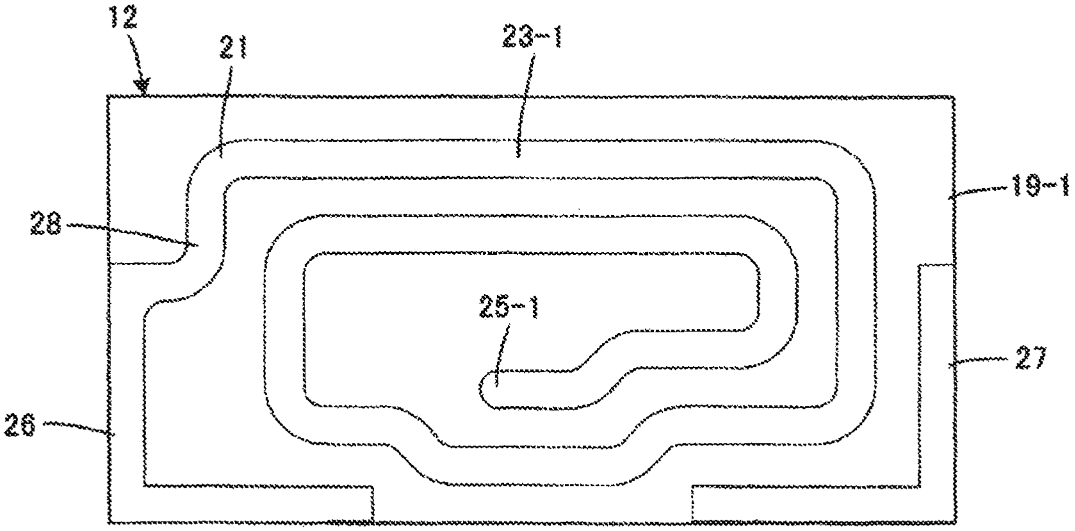
FIG. 19 depicts part of the inductor depicted in FIG. 18, and is a plan view depicting the non-conductive material layer provided with the line conductor which provides the first end portion of a coil.

As depicted in FIG. 19, on the non-conductive material layer 19-1, the line conductor 23-1 connected via the first extended conductor 28 to the first external terminal electrode 26 extends to the pad portion 25-1 in a clockwise direction by approximately 1.75 turns.

Figure 20:
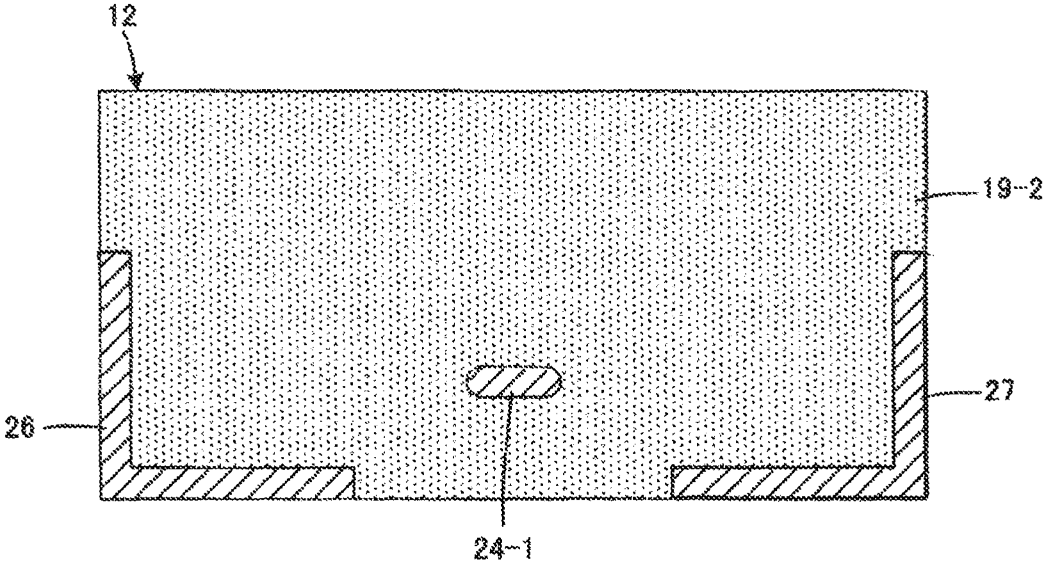
FIG. 20 depicts part of the inductor depicted in FIG. 18, and is a sectional view depicting the non-conductive material layer provided with the via conductor connected to the line conductor.

Next, the non-conductive material layer 19-2 depicted in FIG. 20 is laminated on the non-conductive material layer 19-1. The long via conductor 24-1 is provided so as to penetrate through the non-conductive material layer 19-2. The long via conductor 24-1 connects the line conductor 23-1 and the line conductor 23-2 depicted in FIG. 21 together via the pad portion 25-1.

Here, as can be seen from FIG. 18, the center position of the long via conductor 24-1 (in FIG. 18, provided with the reference numeral "24") in a width direction orthogonal to a longitudinal direction is deviated from the center position of the line conductor 23 in the width direction to the outer peripheral side of the helical orbit formed by the line conductor 23.

Figure 21:
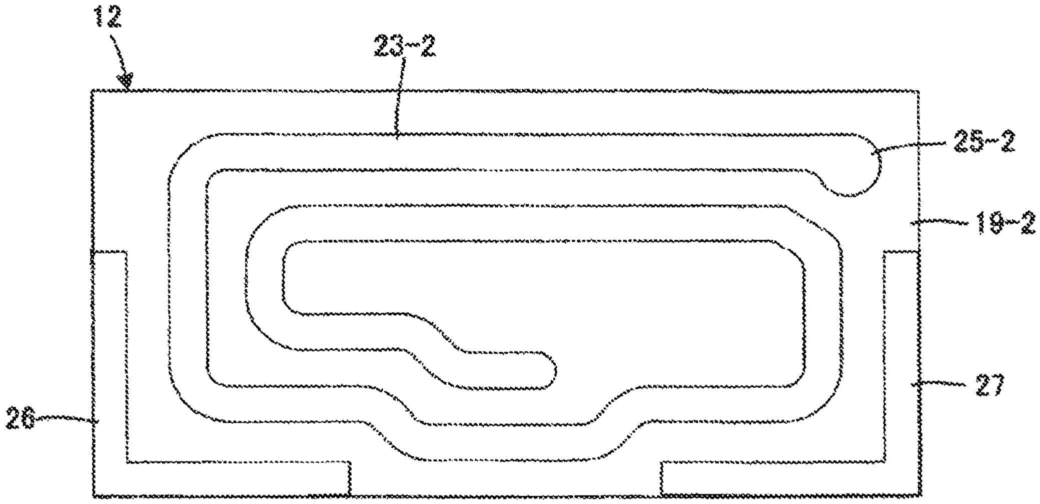
FIG. 21 depicts part of the inductor depicted in FIG. 18, and is a plan view depicting the non-conductive material layer provided with the line conductor connected to the via conductor.

Next, as depicted in FIG. 21, on the non-conductive material layer 19-2, the line conductor 23-2 extends from the position of the long via conductor 24-1 to the pad portion 25-2 in a clockwise direction by approximately 1.5 turns.

Figure 22:
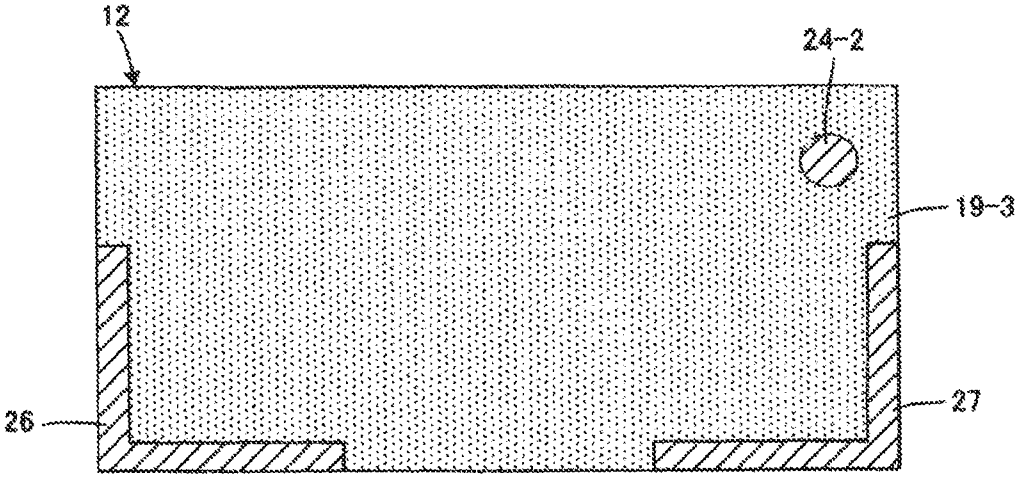
FIG. 22 depicts part of the inductor depicted in FIG. 18, and is a sectional view depicting the non-conductive material layer provided with the via conductor connected to the line conductor.

Next, the non-conductive material layer 19-3 depicted in FIG. 22 is laminated on the non-conductive material layer 19-2. The circular via conductor 24-2 is provided so as to penetrate through the non-conductive material layer 19-3. The via conductor 24-2 connects the line conductor 23-2 and the line conductor 23-3 depicted in FIG. 23 together via the pad portion 25-2.

Figure 23:
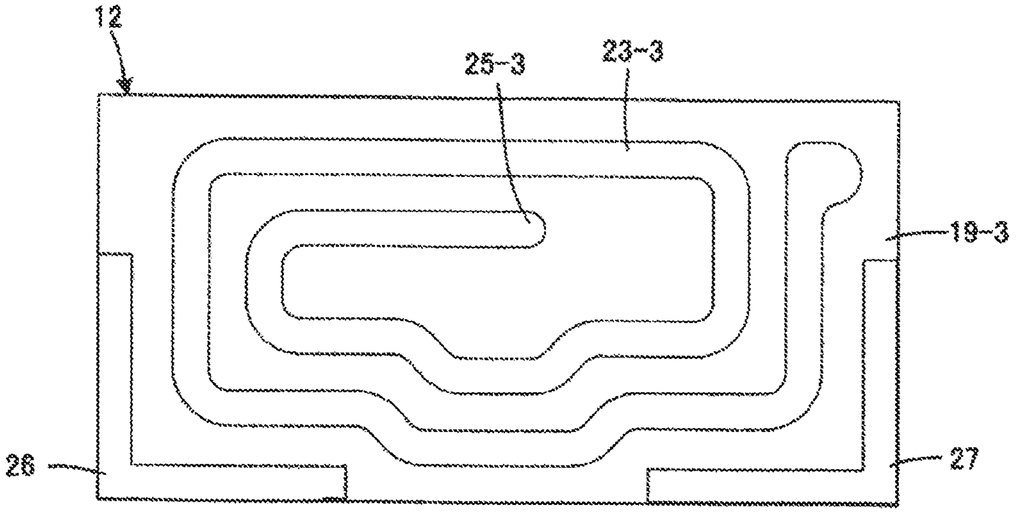
FIG. 23 depicts part of the inductor depicted in FIG. 18, and is a plan view depicting the non-conductive material layer provided with the line conductor connected to the via conductor.

Next, as depicted in FIG. 23, on the non-conductive material layer 19-3, the line conductor 23-3 extends from the position of the circular via conductor 24-2 to the pad portion 25-3 in a clockwise direction by approximately 1.75 turns.

Figure 24:
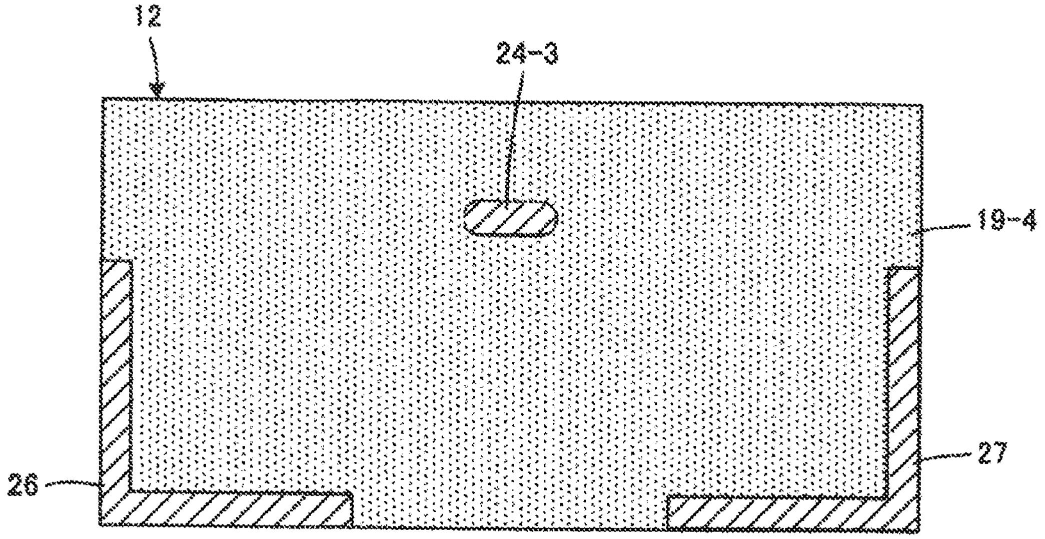
FIG. 24 depicts part of the inductor depicted in FIG. 18, and is a sectional view depicting the non-conductive material layer provided with the via conductor connected to the line conductor.

Next, the non-conductive material layer 19-4 depicted in FIG. 24 is laminated on the non-conductive material layer 19-3. The long via conductor 24-3 is provided so as to penetrate through the non-conductive material layer 19-4. The long via conductor 24-3 connects the line conductor 23-3 and the line conductor 23-4 depicted in FIG. 25 together via the pad portion 25-3.

Here, as can be seen from FIG. 18, the center position of the long via conductor 24-3 (in FIG. 18, provided with the reference numeral "24") in a width direction orthogonal to a longitudinal direction is deviated from the center position of the line conductor 23 in the width direction to the outer peripheral side of the helical orbit formed by the line conductor 23.

Figure 25:
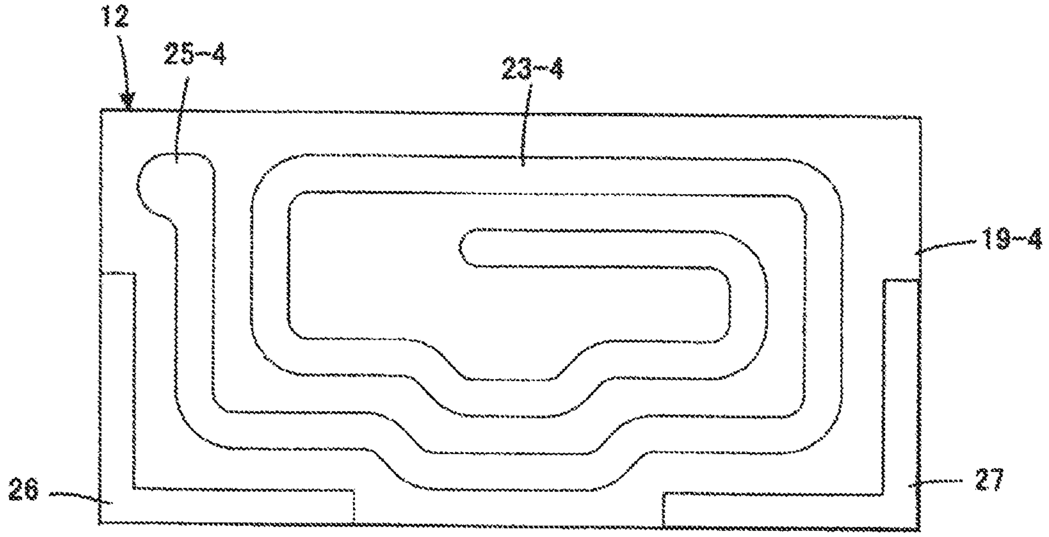
FIG. 25 depicts part of the inductor depicted in FIG. 18, and is a plan view depicting the non-conductive material layer provided with the line conductor connected to the via conductor.

Next, as depicted in FIG. 25, on the non-conductive material layer 19-4, the line conductor 23-4 extends from the position of the long via conductor 24-3 to the pad portion 25-4 in a clockwise direction by approximately 1.75 turns.

Figure 26:
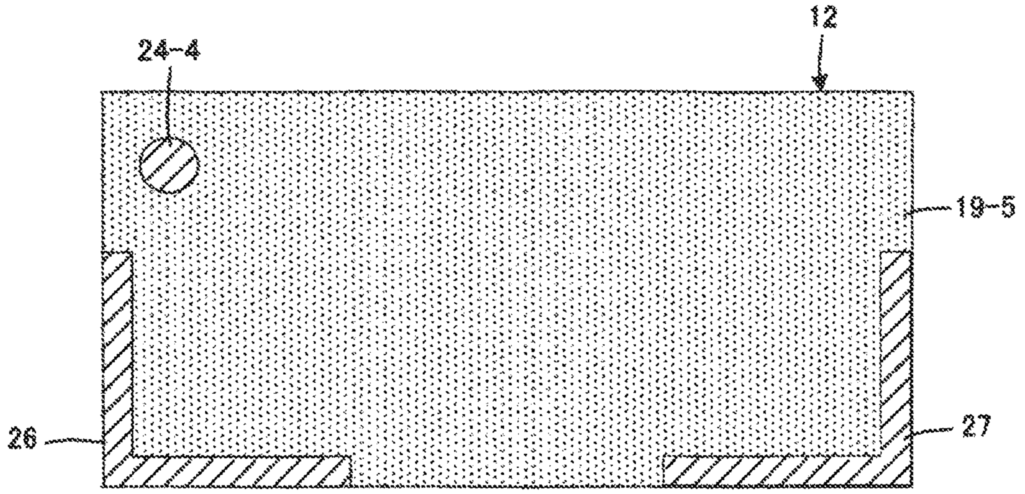
FIG. 26 depicts part of the inductor depicted in FIG. 18, and is a sectional view depicting the non-conductive material layer provided with the via conductor connected to the line conductor.

Next, the non-conductive material layer 19-5 depicted in FIG. 26 is laminated on the non-conductive material layer 19-4. The circular via conductor 24-4 is provided so as to penetrate through the non-conductive material layer 19-5. The via conductor 24-4 connects the line conductor 23-4 and the line conductor 23-5 depicted in FIG. 27 together via the pad portion 25-4.

Figure 27:
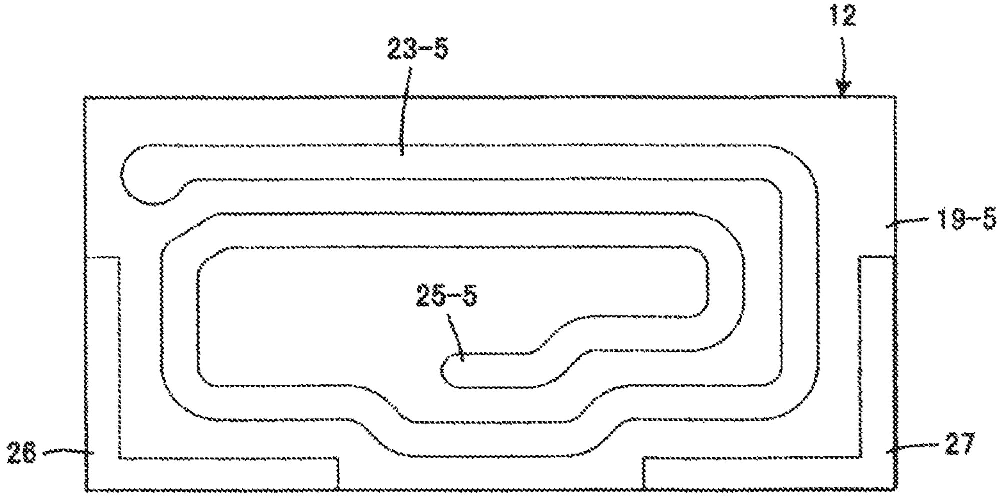
FIG. 27 depicts part of the inductor depicted in FIG. 18, and is a plan view depicting the non-conductive material layer provided with the line conductor connected to the via conductor.

Next, as depicted in FIG. 27, on the non-conductive material layer 19-5, the line conductor 23-5 extends from the position of the circular via conductor 24-4 to the pad portion 25-5 in a clockwise direction by approximately 1.5 turns.

Figure 28:
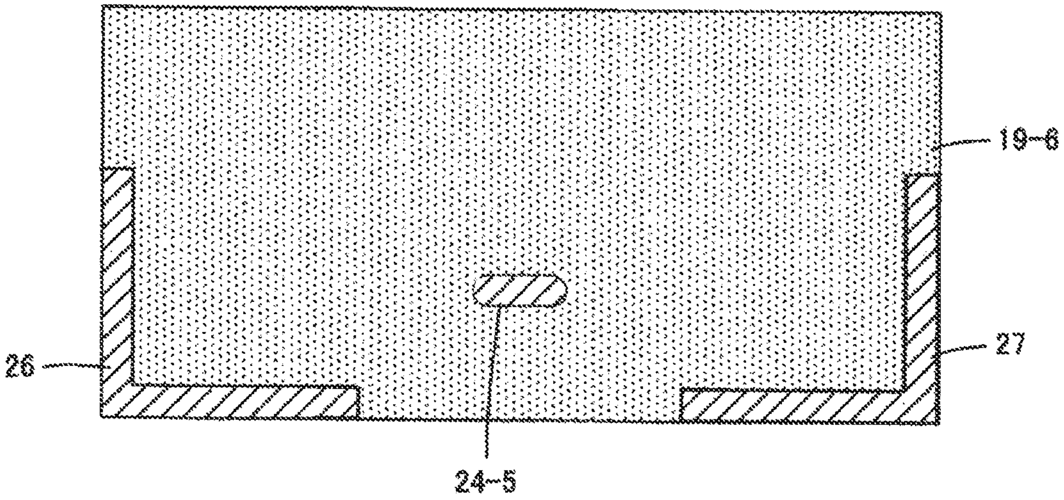
FIG. 28 depicts part of the inductor depicted in FIG. 18, and is a sectional view depicting a non-conductive material layer provided with a via conductor connected to the line conductor.

Next, the non-conductive material layer 19-6 depicted in FIG. 28 is laminated on the non-conductive material layer 19-5. The long via conductor 24-5 is provided so as to penetrate through the non-conductive material layer 19-6. The long via conductor 24-5 connects the line conductor 23-5 and the line conductor 23-6 depicted in FIG. 29 together via the pad portion 25-5.

Here, as can be seen from FIG. 18, the center position of the long via conductor 24-5 (in FIG. 18, provided with the reference numeral "24") in a width direction orthogonal to a longitudinal direction is deviated from the center position of the line conductor 23 in the width direction to the outer peripheral side of the helical orbit formed by the line conductor 23.

Figure 29:
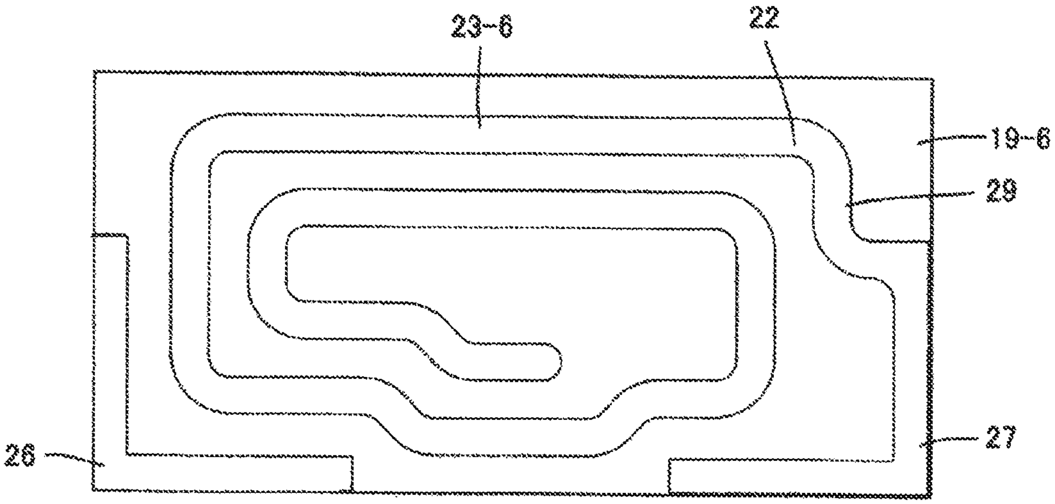
FIG. 29 depicts part of the inductor depicted in FIG. 18, and is a plan view depicting the non-conductive material layer provided with a line conductor which is connected to the via conductor and provides the second end portion of the coil.
Figure 30:
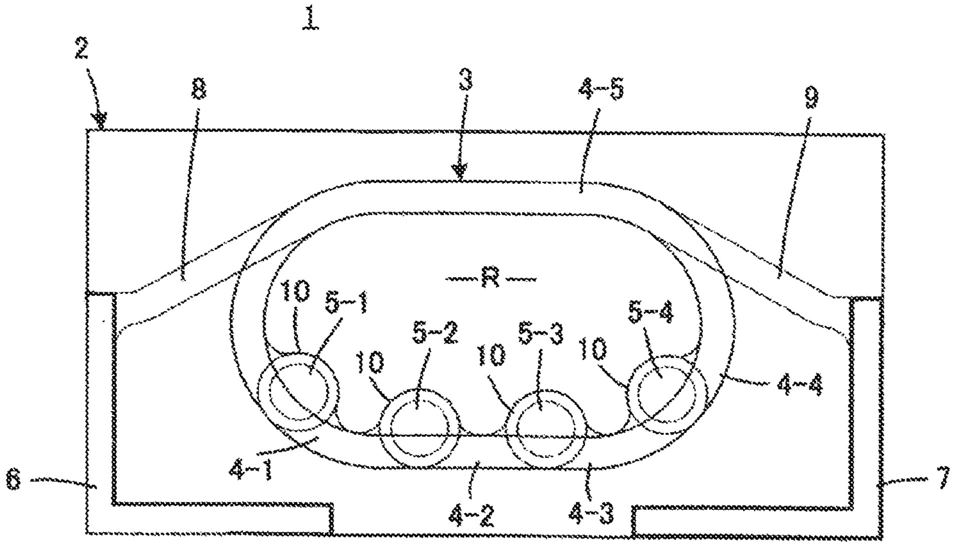
FIG. 30 is a transparent view of an inductor along an axis-line direction of a coil.

Next, as depicted in FIG. 29, on the non-conductive material layer 19-6, the line conductor 23-6 extends from the position of the long via conductor 24-5 in a clockwise direction by approximately 1.75 turns and is connected via the second extended conductor 29 to the second external terminal electrode 27.

Of the first to fifth embodiments described above, the first to fourth embodiments commonly have a feature in which the line width of the line conductor 23 in the width direction in the same interface between the non-conductive material layers 19 is constant. According to this structure, asperities on the inner peripheral edge side of the coils 20, 20*a*, 20*b*, and 20*c* can be decreased. Thus, interruption of the magnetic flux can be decreased or eliminated. Also, occurrence of loss due to current concentration or the like can be suppressed. Note that although the line width of the line conductor 23 in the width direction is constant, a portion where the line width is changed may be present in, for example, a corner portion or the like.

In the fifth embodiment, in portions where the line conductor 23-2 depicted in FIG. 21 and the line conductor 23-3 depicted in FIG. 23 are connected to the circular via conductor 24-2, the dimension in the width direction is larger than any other portion. Also, in portions where the line conductor 23-4 depicted in FIG. 25 and the line conductor 23-5 depicted in FIG. 27 are connected to the circular via conductor 24-4, the dimension in the width direction is larger than any other portion. However, these portions where the dimension in the width direction is increased merely provide a mode of outward projection of the orbital portion on the outermost periphery. Thus, this does not serve as a cause for interruption of the magnetic flux. Furthermore in the fifth embodiment, most of the line conductor 23 on the same interface between the non-conductive material layers 19 is constant in dimension in the width direction. Thus, loss due to current concentration or the like can be suppressed.

While the present disclosure has been described above in association with several depicted embodiments, various other modifications can be thought in the scope of the present disclosure.

For example, in the depicted embodiments, the coils 20, 20*a*, 20*b*, 20*c*, and 20*d* are each arranged in a state in which its axis line is oriented to a direction parallel to the mount surface 13 inside the component main body 12. However, by changing the laminating direction of the non-conductive material layers, the axis line of the coil may be oriented to a direction orthogonal to the mount surface. Also, as being oriented to a direction parallel to the mount surface, the axis line of the coil may be oriented to a longitudinal direction (for example, a left-right direction in FIG. 2) of the component main body.

Also in the depicted embodiments, the external terminal electrodes 26 and 27 are each provided over two surfaces, that is, the mount surface 13 of the component main body 12 and its adjacent first end face 17 and second end face 18, respectively. However, for example, the external terminal electrodes 26 and 27 may be formed so as to extend to the top surface 14 and the first side surface 15 and the second side surface 16, respectively, or may be formed only on the mount surface 13. The area of forming each external terminal electrode can be freely changed as required.

Also, the total number of turns of the plurality of line conductors included in the coil can be freely changed by changing the number of connections between the line conductors and the via conductors.

Furthermore, each embodiment described in the specification is an example, and partial replacement or combination in structure can be made among different embodiments.

What is claimed is:

1. An inductor comprising:

a component main body including a non-conductive material; and a coil inside the component main body, the coil having a plurality of line conductors and a plurality of via conductors, each line conductor extending along a principal surface of the component main body, each via conductor extending perpendicularly to the principal surface of the component main body, each line conductor having a pad portion connected to a respective one of the via conductors, the coil having a helical orbit formed by the line conductors and the via conductors being connected together, wherein the plurality of via conductors include a long via conductor that, when transparently viewed in an axis-line direction of the coil, has an elongated shape with a length dimension that is longer than a width dimension, the length dimension extending in a longitudinal direction of the long via conductor that follows the helical orbit of the coil, the width dimension extending in a width direction of the long via conductor that is orthogonal to the longitudinal direction of the long via conductor, and when transparently viewed in the axis-line direction of the coil, a center position of the long via conductor in the width direction of the long via conductor is deviated, in the width direction of the long via conductor, from a center position in a width direction of the respective pad portion connected to the long via conductor, the width direction of the respective pad portion being orthogonal to the longitudinal direction of the long via conductor.

2. The inductor according to claim 1, wherein the center position of the long via conductor is deviated to an outer peripheral side of the helical orbit.

3. The inductor according to claim 1, wherein the center position of the long via conductor in the width direction of the long via conductor is deviated to an inner peripheral side of the helical orbit.

4. The inductor according to claim 2, wherein the plurality of via conductors include a second long via conductor that, when transparently viewed in the axis-line direction of the coil, has an elongated shape with a length dimension that is longer than a width dimension, the length dimension of the second long via conductor extending in a longitudinal direction of the second long via conductor that follows the helical orbit of the coil, the width dimension of the second long via conductor extending in a width direction of the second long via conductor that is orthogonal to the longitudinal direction of the second long via conductor, and when transparently viewed in the axis-line direction of the coil, a center position of the second long via conductor in the width direction of the second long via conductor is deviated to an inner peripheral side of the helical orbit.

5. The inductor according to claim 1, wherein the coil includes a first line conductor which is one of the plurality of line conductors and has the respective pad portion, and a second line conductor which is one of the plurality of line conductors and is connected to the long via conductor from the opposite side to the respective pad portion, and when transparently viewed in the axis-line direction of the coil, the center position of the long via conductor is deviated from a center position in a width direction of a part of the second line conductor where the long via conductor is connected, the width direction of the part of the second line conductor being orthogonal to the longitudinal direction of the second long via conductor.

6. The inductor according to claim 5, wherein the center position of the respective pad portion in the width direction of the respective pad portion is deviated from the center position in the width direction of the part of the second line conductor where the long via conductor is connected.

7. The inductor according to claim 1, wherein the width dimension of the long via conductor is larger than a width dimension in a width direction of the respective line conductor that includes the respective pad portion, the width direction of the respective line conductor being orthogonal to the longitudinal direction of the long via conductor.

8. The inductor according to claim 1, wherein the width dimension of the long via conductor is larger than a width dimension of the respective pad portion in the width direction of the respective pad portion.

9. The inductor according to claim 1, wherein a line width of one of the plurality of line conductors is constant.

10. The inductor according to claim 1, wherein one of the plurality of line conductors has a number of turns being from 0.7 turns to smaller than 2 turns.

11. The inductor according to claim 1, wherein some of the plurality of line conductors have a same number of turns smaller than one turn.

12. The inductor according to claim 2, wherein a line width of one of the plurality of line conductors is constant.

13. The inductor according to claim 3, wherein a line width of one of the plurality of line conductors is constant.

14. The inductor according to claim 4, wherein a line width of one of the plurality of line conductors is constant.

15. The inductor according to claim 2, wherein one of the plurality of line conductors has a number of turns being from 0.7 turns to smaller than 2 turns.

16. The inductor according to claim 3, wherein one of the plurality of line conductors has a number of turns being from 0.7 turns to smaller than 2 turns.

17. The inductor according to claim 4, wherein one of the plurality of line conductors has a number of turns being from 0.7 turns to smaller than 2 turns.

18. The inductor according to claim 2, wherein some of the plurality of line conductors have a same number of turns smaller than one turn.

19. The inductor according to claim 3, wherein some of the plurality of line conductors have a same number of turns smaller than one turn.

20. The inductor according to claim 4, wherein some of the plurality of line conductors have a same number of turns smaller than one turn.

* * * * *